United States Patent
Kuo et al.

(10) Patent No.: US 8,018,820 B2
(45) Date of Patent: Sep. 13, 2011

(54) MAGNETIC RECORDING SYSTEM USING E-BEAM DEFLECTION

(75) Inventors: David S. Kuo, Palo Alto, CA (US); Kim Y. Lee, Fremont, CA (US)

(73) Assignee: Seagate Technology, LLC, Cupertino, CA (US)

( * ) Notice: Subject to any disclaimer, the term of this patent is extended or adjusted under 35 U.S.C. 154(b) by 96 days.

(21) Appl. No.: 12/192,338

(22) Filed: Aug. 15, 2008

(65) Prior Publication Data

US 2010/0039727 A1 Feb. 18, 2010

(51) Int. Cl.
*G11B 9/00* (2006.01)

(52) U.S. Cl. .......... 369/126; 360/75; 365/118; 365/128

(58) Field of Classification Search .................. 369/126, 369/100, 101; 360/75; 365/118, 128, 151
See application file for complete search history.

(56) References Cited

U.S. PATENT DOCUMENTS

| | | | |
|---|---|---|---|
| 3,573,767 A * | 4/1971 | McCary et al. ............. 369/13.01 |
| 4,534,016 A * | 8/1985 | Kirkpatrick et al. .......... 365/128 |
| 4,581,717 A * | 4/1986 | Kaneko ............ 365/10 |
| 4,668,609 A | 5/1987 | Seiwatz |
| 5,293,281 A | 3/1994 | Behr et al. |
| 5,687,036 A | 11/1997 | Kassab |
| 6,005,751 A | 12/1999 | Kazmierczak et al. |
| 6,226,233 B1 | 5/2001 | McDaniel et al. |
| 6,307,826 B1 * | 10/2001 | Katsumura et al. ........... 369/101 |
| 6,510,015 B2 | 1/2003 | Sacks et al. |
| 6,643,161 B2 * | 11/2003 | Hannah et al. ................ 365/118 |
| 6,697,317 B2 * | 2/2004 | Hagiwara ..................... 369/126 |
| 6,738,207 B1 | 5/2004 | Belser et al. |
| 6,754,017 B2 | 6/2004 | Rettner et al. |
| 6,882,615 B2 * | 4/2005 | Katsumura ............... 369/275.4 |
| 7,095,580 B2 | 8/2006 | Ehrlich et al. |
| 7,113,360 B2 * | 9/2006 | Formato et al. ................ 360/75 |
| 7,184,382 B2 * | 2/2007 | Nakada et al. ................ 369/100 |
| 7,218,470 B2 * | 5/2007 | Deeman et al. ................ 360/75 |
| 7,473,910 B2 * | 1/2009 | Kojima .................... 250/492.22 |
| 2001/0052577 A1 * | 12/2001 | Aki et al. .................... 250/492.2 |
| 2002/0034152 A1 | 3/2002 | Kumasaka et al. ........ 369/272 |
| 2002/0186632 A1 * | 12/2002 | Kumasaka et al. ........ 369/47.49 |
| 2004/0021971 A1 | 2/2004 | Hanson et al. |
| 2005/0151284 A1 * | 7/2005 | Soeno ......................... 264/1.33 |
| 2006/0061900 A1 | 3/2006 | Ohtsuka et al. |
| 2006/0076509 A1 * | 4/2006 | Okino et al. ............. 250/492.2 |
| 2007/0041238 A1 | 2/2007 | Belov |
| 2007/0160932 A1 * | 7/2007 | Kojima ........................ 430/296 |
| 2009/0207395 A1 * | 8/2009 | Kasono ........................... 355/67 |

FOREIGN PATENT DOCUMENTS

WO 2004013843 A1 2/2004

* cited by examiner

*Primary Examiner* — Tan X Dinh
(74) *Attorney, Agent, or Firm* — Ladas & Parry, LLP

(57) ABSTRACT

A recording system for magnetic storage devices, including a beam column for generating a beam, a platform for moving a magnetic storage medium relative to the beam, and a signal generator for sequentially, or in a continuously alternating manner, deflecting the beam. In turn, the beam is directed according to displacement of dots on the extent of the magnetic storage medium such that dots of a plurality of dot groupings can be written to on the extent during a single pass of the beam column above the extent.

19 Claims, 6 Drawing Sheets

MAGNETIC RECORDING SYSTEM USING E-BEAM DEFLECTION

BACKGROUND

Magnetic storage devices are used to store data on a magnetic storage medium through the use of writer and reader elements, which respectively write and read magnetic data on the medium. For example, a disk storage device is generally adapted to work with one or more magnetic recording disks that are coaxially mounted on a spindle motor of the device for high-speed rotation. As the disks rotate, one or more transducers, i.e., read and/or write heads, are moved across the surfaces of the disks by an actuator assembly to read and write digital information on the disks.

Given the general desire to store ever-increasing amounts of digital information, designers and manufacturers of magnetic storage devices are continually attempting to increase the bit density of magnetic storage media. In a magnetic recording disk, this means increasing the areal density, i.e., the number of tracks on a disk and/or the linear density of bits along a given track. New materials, as well as new recording methods, have helped increase the areal density. For example, perpendicular magnetic recording systems have been developed for use in computer hard disk drives. Because magnetic flux is found to magnetize the magnetic recording layer of perpendicular recording media in a vertical orientation, a higher areal density can be achieved compared with longitudinal magnetic recording systems.

Areal densities have also been increased by decreasing the number of magnetic grains in one data bit and by simultaneously decreasing the size of the magnetic grains. However, in the process, media writeability can become an issue due to the need to raise anisotropy of the magnetic media in order to maintain thermal stability of smaller magnetic grains. In addition, many grains (e.g., about 40-60 grains) are still needed to achieve signal-to-noise ratio in a single recording bit due to random placement of the grains. One solution to the above issues has involved the use of bit-patterned media (BPM).

In BPM, the magnetic recording surface is patterned to provide a number of discrete, single-domain magnetic islands (usually one island per bit) separated from each other at pre-determined locations. Because each island location is pre-determined, each recording bit only needs to contain one island, thereby greatly enhancing the areal density. Servo information is often included on the BPM in order to provide positioning information for a servo control system. To this end, during a writing operation on a BPM, a write or recording head can be precisely positioned over a given data array, e.g., data track, to magnetize the bits thereon, where such bits are often referred to as dots. Thus, for example, during the rotation of a magnetic recording disk, the writing process can be carefully synchronized with the dots passing by the head in order to facilitate accurate recording and eventual readback of data to and from the dots.

Further efforts have been made with respect to magnetic storage devices to increase the areal density that BPM now affords. One issue of magnetic recording is that when writer dimension shrinks, the output field becomes weaker and curved. To overcome this, a special arrangement of dots can be designed to maintain a wide writer and reader. For example, on a magnetic recording disk, each concentric track can be provided to hold two or more groupings (e.g., rows) of dots such that a wide writer and reader can still discern individual dots. Accordingly, magnetic storage devices have been configured to operate with a write head and a read head adapted to write and read the two or more groupings of dots during a single pass about the BPM. In reading the dot groupings in such manner, the read head can be controlled to read from the two or more groupings while the corresponding track is moved below the head. Accordingly, the dots of such groupings are generally staggered such that the head can read each of the dots in a single pass above the track.

The write process as described above demands very high placement accuracy of the adjacent dots within the grouping to ensure proper write synchronization. This has proved to be somewhat challenging for master pattern creation with a rotating e-beam system. As such, in a two-row staggered dot arrangement for example, e-beam writing is typically done by initially writing a first row and then subsequently writing a second row. Due to mechanical motion and time-delta between writing of each row, it is difficult to control relative placement of adjacent dots.

FIG. 1 exemplifies the above-described conventional writing technique. A portion of a magnetic recording disk 2 is shown, with four partial rows of dots 4 subdivided in two partial data tracks 6 and 8. In using the above-referenced writing technique, a recording head (not shown) is positioned over one of the data tracks, e.g., data track 6, and writes to a corresponding first row of dots 4, e.g., row 7a, as the disk 2 is rotated below the head. As such, while the disk 2 is generally rotated in direction A, the dots 4 of the first row are sequentially written to in direction B (the direction of the arrows between the dots 4). Following the first row being written, a second row, e.g., row 7b, of such data track is similarly written to as the disk 2 is rotated. Subsequently, the recording head can be positioned over the adjacent data track, e.g., data track 8, so that the corresponding rows, 9a and 9b, of such track can be likewise written to.

As described above, writing to a single grouping of dots in a data array presents the challenge of accurately synchronizing the writing process. However, further difficulty is encountered when two or more groupings of dots of a data array are written to so that the groupings can be subsequently read in a single pass by a recording head. For example, with respect to two adjacent rows of dots, this further challenge involves synchronizing the second written row so that each dot therein is accurately written to with respect to the first written row of dots. Such accurate placement of data with respect to the second row of dots, among other things, minimizes errors in subsequent readback of the dot groupings. As is known, the placement accuracy of the adjacent row has been generally dependent on precision phase-lock of pattern clock to spindle encoder. However, errors have been found to occur from deficiencies in maintaining this position accuracy, as described below.

When recording data on magnetic recording disks, magnetic storage devices have typically been provided with an encoder at a bottom end of the spindle (the end opposite to that of the spindle on which the turntable is mounted) so as to provide a precise motor control. In other words, the encoder is mounted in such position such that there is substantially no eccentricity with respect to the axis of rotation of the spindle. This allows for a very precise control of the motor based on the encoder signals. However, such positioning of the encoder is problematic when used to provide a clock, position or velocity source for the format signal generation process during recording. This is due to mechanical vibrations, however slight, which occur in the rotating portions of the recording system. In particular, the vibrations at the top of the spindle (where the turntable is located) and at the bottom of the spindle (where the encoder is located) are not synchronized. Because the distances employed in data tracks are extremely small (generally in the range of nanometers), even minute disturbances can create phase error problems, e.g., between paired dot groupings. It is desirable to minimize these types of errors.

SUMMARY

Embodiments of the invention relate to apparatus and methods used for magnetic storage devices in writing to magnetic storage media. In certain embodiments, a recording system for magnetic storage devices is provided, where the recording system comprises a beam column for generating a beam. The system comprises a platform for moving a magnetic storage medium relative to the beam. In one group of embodiments, the beam is applied to dots of a plurality of dot groupings on an extent of the magnetic storage medium during a single pass of the beam column above the extent. In another group of embodiments, the beam is applied in a continuously alternating manner to dots on an extent of the magnetic storage medium. In some embodiments, the system comprises a signal generator for sequentially supplying a series of deflection signals to deflection plates of the beam column, so as to deflect the beam according to displacement of the dots on the extent of the magnetic storage medium.

In certain embodiments, a method of recording to a plurality of dot groupings on a magnetic storage medium is provided. The method comprises generating a beam from a beam column and moving a magnetic storage medium relative to the beam whereby the beam is applied along an extent of the magnetic storage medium as the magnetic storage medium is moved. The method further comprises deflecting the beam as the beam is applied to the extent of the magnetic storage medium, so as to direct the beam according to displacement of dots amongst a plurality of dot groupings on the extent as the magnetic storage medium is moved.

These and various other features and advantages will be apparent from a reading of the following detailed description.

DETAILED DESCRIPTION OF THE PREFERRED EMBODIMENTS

Figure 1:
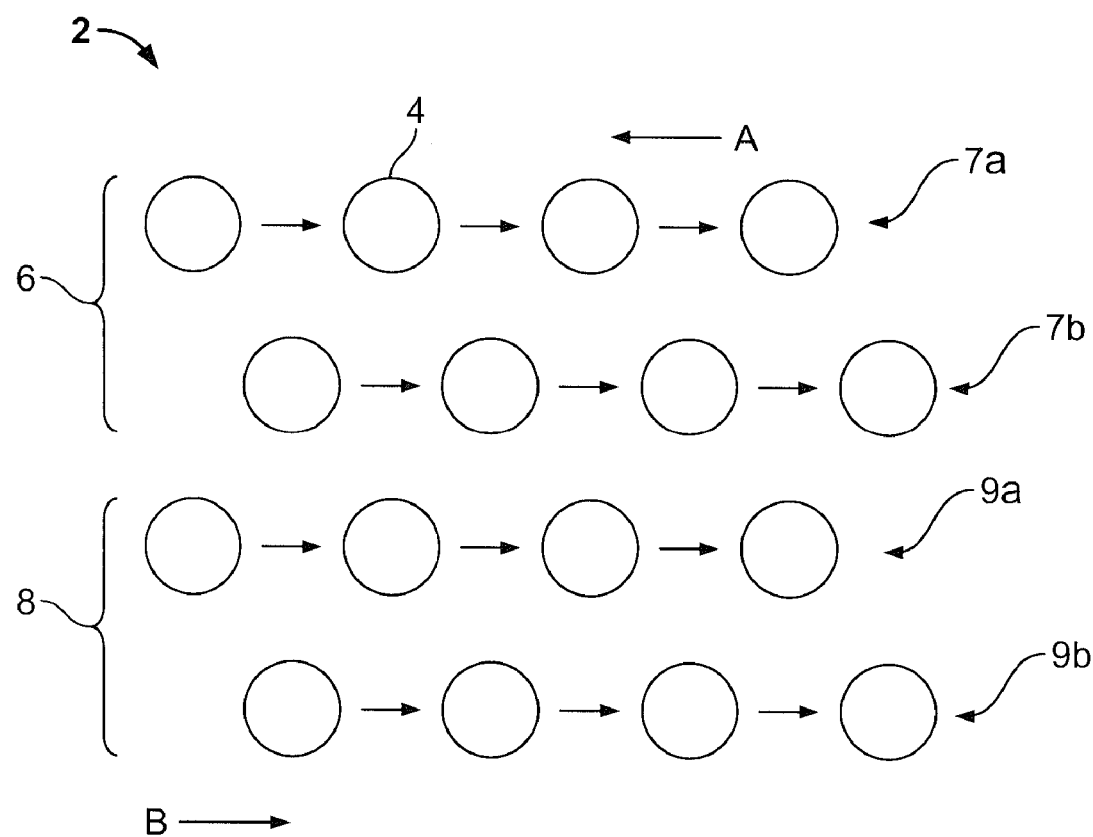
FIG. 1 is a top view of a magnetic storage medium illustrating a conventional writing technique for a dot pattern thereon.

The following detailed description should be read with reference to the drawings, in which like elements in different drawings are numbered identically. Embodiments shown in the drawings are not necessarily to scale, unless otherwise noted. It will be understood that embodiments shown in the drawings and described herein are merely for illustrative purposes and are not intended to limit the invention to any embodiment. On the contrary, it is intended to cover alternatives, modifications, and equivalents as may be included within the scope of the invention as defined by the appended claims.

Figure 2:
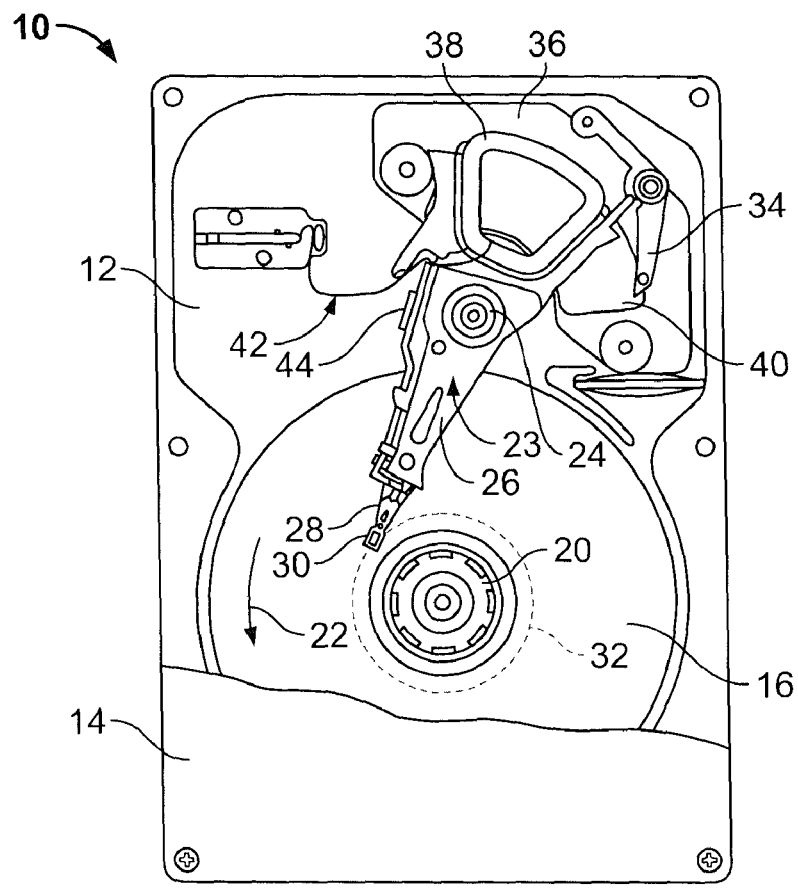
FIG. 2 is a top plan view of a magnetic storage device in accordance with certain embodiments of the present invention.

FIG. 2 is a top plan view of a magnetic storage device 10 in accordance with certain embodiments of the invention. In the embodiment shown, the device 10 takes the form of a disk drive of the type used to interface with a host computer to magnetically store and retrieve user data. The disk drive includes various components mounted to a base 12. A top cover 14 (shown in partial cutaway fashion) cooperates with the base 12 to form an internal, sealed environment for the disk drive.

The magnetic storage device 10 includes magnetic storage media for recording data. In the embodiment shown in FIG. 2, the media takes the form of a plurality of axially-aligned, magnetic recording disks 16 mounted to a spindle motor (shown generally at 20) for rotating at a speed in a rotational direction 22. An actuator 23, which rotates about a bearing shaft assembly 24 positioned adjacent the disks 16, is used to write and read data to and from tracks (not designated) on the disks 16.

The actuator 23 includes a plurality of rigid actuator arms 26. Flexible suspension assemblies 28 are attached to the distal end of the actuator arms 26 to support a corresponding array of transducers 30 (e.g., read and/or write heads) with one transducer adjacent each disk surface. Each transducer 30 includes a slider assembly (not separately designated) designed to fly in close proximity to the corresponding surface of the associated disk 16. Upon deactivation of the disk drive 10, the transducers 30 come to rest on an outer stop 32 and a magnetic latch 34 secures the actuator 23.

A voice coil motor (VCM) 36 is used to move the actuator 23 and includes an actuator coil 38 and permanent magnet 40. Application of current to the coil 38 induces rotation of the actuator 23 about the pivot assembly 24. A flex circuit assembly 42 provides electrical communication paths between the actuator 23 and a disk drive printed circuit board assembly (PCBA) mounted to the underside of the base 12. The flex circuit assembly 42 includes a preamplifier/driver circuit 44 which applies currents to the transducers 30 to read and write data.

Figure 3:
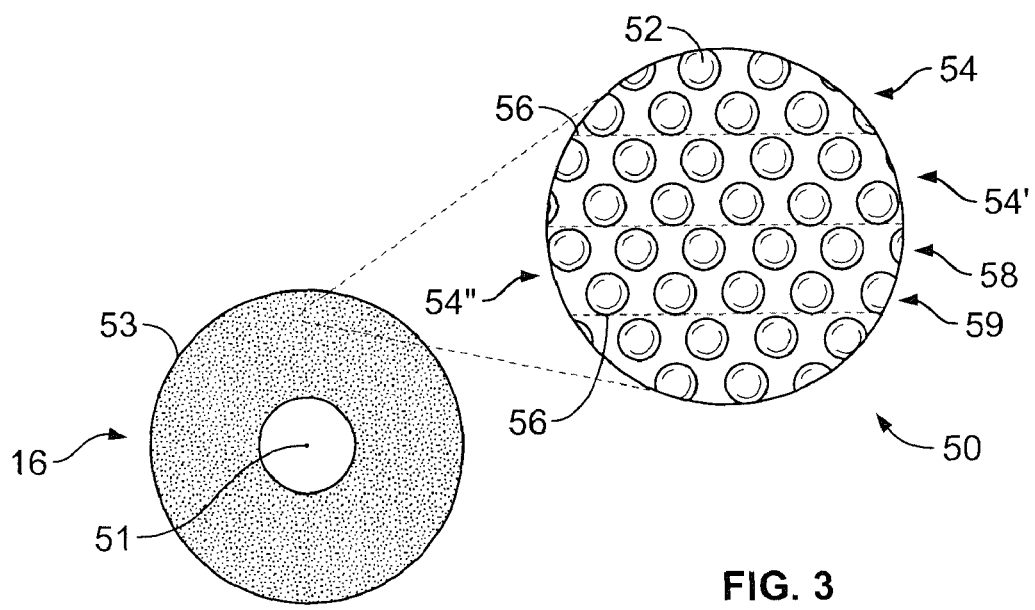
FIG. 3 is a top plan view of a data bit pattern of a magnetic storage medium in accordance with certain embodiments of the present invention.

FIG. 3 is a top plan view of one magnetic storage disk 16, with an enlarged area illustrating a data bit pattern 50 in accordance with certain embodiments of the invention. The magnetic storage disk 16 is shown as a bit patterned medium (BPM), wherein the data bit pattern includes a plurality of separate and discrete recording bits or dots 52 organized in a staggered bit pattern. The BPM generally includes a non-magnetic substrate with an overlying magnetic recording layer with perpendicular anisotropy, along with one or more interlayers between the substrate and the magnetic layer according to some embodiments. The magnetic layer is patterned to form the discrete and separate dots 52.

The dots 52 extend around the disk 16 and are divided into a plurality of data arrays. In certain embodiments, as shown, the data arrays can take the form of concentrically spaced data tracks, e.g., data tracks 54, 54' and 54", each being defined by bordering dashed lines 56 and generally perpendicular to the radius of the disk. Although the data arrays comprise concentric data tracks in the magnetic storage medium in this embodiment, it should be appreciated that the data arrays may have alternate configurations and geometries when provided in other data storage mediums. Returning to FIG. 3, each data array in this embodiment comprises a plurality of staggered dots 52 extending around the disk. The data arrays comprise a staggered, two-bit wide dot pattern, each data array having at least a first grouping 58 of dots 52 and a second grouping 59 of dots 52. For example, with reference to FIG. 3, the first grouping 58 involves a row of outer diameter dots 52 and the second grouping 59 involves a row of inner diameter dots 52. Although the data arrays in FIG. 3 are depicted as being two bits wide, it is contemplated that the arrays may also be wider than two bits according to some embodiments.

The data arrays of FIG. 3 are further organized into one or more data sectors having a plurality of recording bits magnetized by the transducer 30 to record data. The term "recording bit" is used herein to represent dots in which the transducer, e.g., read/write head, can repeatedly record and/or overwrite data, such as, for example, the data routed to a storage device from a computer operating system (sometimes referred to herein as "user data"). In contrast, position information may initially be recorded in a "servo" sector or servo bits, but is usually not repeatedly recorded and/or overwritten in servo bits in the same way as data is recorded in the recording bits. A servo sector may include sector and track identification codes as well as servo burst patterns used to maintain the head's position over the center of the data track.

As known, magnetic storage devices generally include a control system for accurately and reliably recording and reading data. For example, a disk storage device, such as the device 10 exemplified in FIG. 2, usually includes a closed-loop servo control system (not visibly shown) to control the movement of the transducers 30 across the surfaces of their associated magnetic recording disks 16. For example, with reference to FIGS. 2 and 3, to reliably write data to and read data from a specified data array (e.g., data track 54) on one of the magnetic recording disks 16, an associated transducer 30 is generally positioned over the center of the data array as the array moves beneath the transducer 30. To position the transducer 30 during one operation, the servo control system first typically performs a seek function in which the transducer 30 is moved from its current position to the specified data array. Upon reaching the destination data array, the servo control system then performs a tracking function in which the position of the transducer 30 is monitored and adjusted to ensure that it is following the data array.

Continuing with the above example, the servo control system generally receives a servo information signal from the transducer 30 indicating the transducer's position as it passes over one or more servo sectors on the corresponding disk 16. The servo control system then processes the servo information signal to determine the current position of the transducer 30 and the movements to adjust the position of the transducer 30, if necessary. Disk storage devices, such as the device 10 exemplified in FIG. 2, generally employ either dedicated servo systems, in which a separate disk is dedicated to storing servo information, or an embedded servo system in which servo sectors are positioned between data sectors on a single disk. A servo sector may include sector and array identification codes as well as servo burst patterns used to maintain the transducer's position over the center of the data array.

Figure 4:
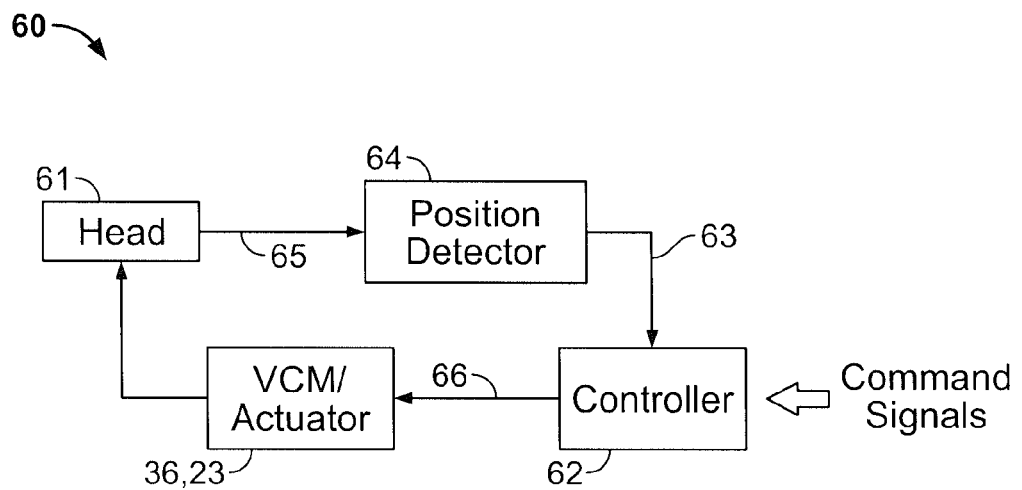
FIG. 4 is a block diagram of servo control system in accordance with certain embodiments of the present invention.

FIG. 4 shows a functional block diagram of a servo control system 60 in accordance with certain embodiments of the invention. As described above with reference to FIG. 3, the system 60 can operate with the disk storage device 10 to provide positional control for the one or more transducers 30, each being a read and/or write head 61. The servo control system 60 generally includes a controller 62 (e.g., a digital signal processor), which receives command signals from a host system (e.g., personal computer) and one or more position signals 63 from a servo position detector 64, according to certain embodiments of the invention. The position detector 64, in certain embodiments, receives a readback signal 65 from the head 61 from which it extracts, or generates, the one or more position signals 63. In turn, the controller 62 processes the one or more position signals 63 and any command signals from the host system and sends a corresponding control signal 66 to the VCM 36 to move the actuator 23 and the transducer 30, or head 61.

Figure 5:
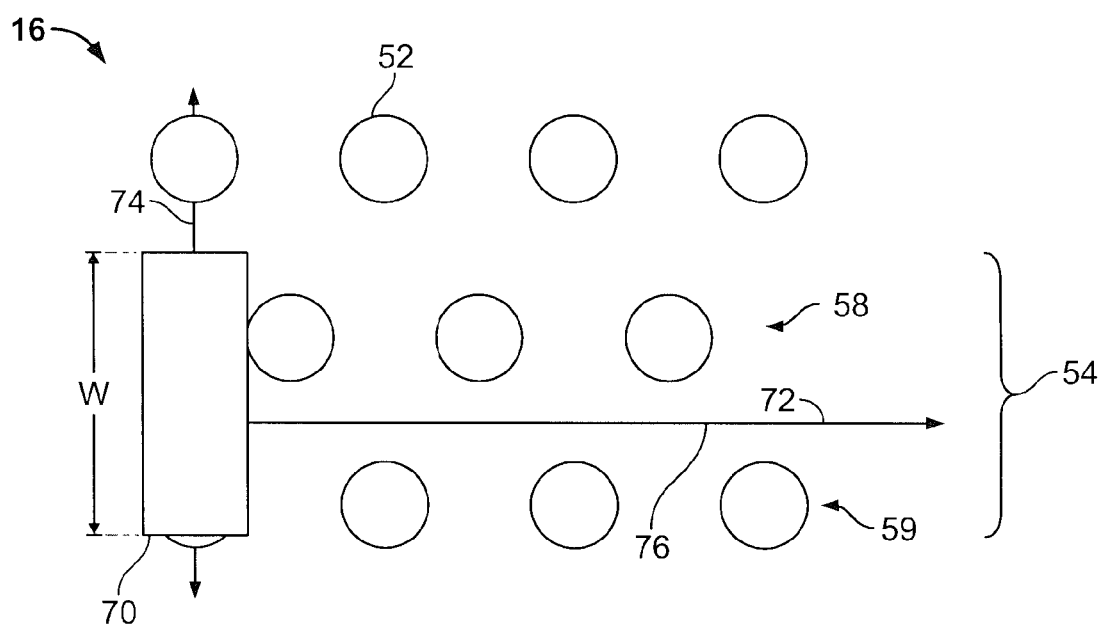
FIG. 5 is a top view of a portion of the magnetic storage medium of FIG. 3 illustrating a dot pattern along with a recording head of the magnetic storage device of FIG. 2 in accordance with certain embodiments of the present invention.

FIG. 5 is a top plan view of a read/write head 70 (e.g., of the device 10 shown in FIG. 2) positioned adjacent one data array in a user data sector on a portion of a magnetic storage medium in accordance with certain embodiments of the invention. The read/write head 70 is referenced distinctly from the read/write head 61 of FIG. 4 because such head 70, in certain embodiments, may be used without a servo control system (as alluded to below). The magnetic storage medium, in certain embodiments, can be the magnetic recording disk 16 of FIG. 3, with the one data array being a corresponding data track (e.g., data track 54). In such embodiments, the head 70 reads from and/or writes to the dots 52 of the data track 54 in a downtrack direction 72 as the disk 16 and track 54 move below the head 70. As shown, the head 70 has a sufficient width, W, to read and/or write user data across the width of the track 54, which in this embodiment is two dots 52 wide. The head 70 also moves via the actuator 23 (shown in FIG. 2) across the data tracks of the disk 16 along a crosstrack path 74, between the inside diameter and outside diameter of the disk 16. The head 70 is positioned over the track 54 as it flies down the track 54 in order to effectively sense the magnetic fields emanating from the dots 52 and/or to adequately induce a magnetic field in a particular dot 52 in the track 54. Ideally, the position of the head 68 would be maintained over a centerline 76 of the track 54 as it flies down the track 54; however, such would not be required.

As described above, magnetic storage devices have been configured to control their recording heads so that the heads can be accurately positioned over a desired data array on a magnetic storage medium, e.g., a data track on a magnetic recording disk. Any one of a variety of methods can be used in controlling the positioning of the recording heads in such manner. One exemplary method can involve the use of server sectors on the medium and a servo control system, as described above. A further method to keep the recording head positioned over the desired data array, but also to keep the head centered over the array, without necessarily requiring dedicated servo sectors on the medium, can involve use of the transducer's readback signal. Such method can involve the readback signal being dependent upon the plurality of dots on a corresponding data array. Using one of the above methods or various other methods, the recording heads can be effectively positioned so as to lie above the desired data array as the storage medium rotates so as to read from or write to the array.

In some magnetic storage mediums, the data arrays thereon are each provided with one grouping, e.g., one row, of dots, which a recording head can write to or read from. However, as described above, use of BPM has enabled dots to be positioned in a much closer proximity than what has been previously allowed using continuous magnetic medium. Consequently, as exemplified with reference to FIG. 3, BPM can be constructed so as to include data arrays each having a plurality of dot groupings thereon. In turn, with reference to FIG. 5, heads of magnetic storage devices have been designed so as to read a plurality of dot groupings in a single pass of the storage medium. Such dot groupings, with continued reference to FIG. 5, can be provided as adjacent rows of dots 52 in the data array, e.g., rows 58 and 59 in data track 54. In certain embodiments, the dots 52 of each of the rows 58, 59 can be staggered with respect to each other. Accordingly, as the head 68 passes over the data array 54, it generally covers, and can correspondingly alternate its readback between, both of the rows 58, 59 so as to read the dots 52 therein.

However, with the ability to increase areal density of magnetic storage media using BPM, and with the corresponding opportunity to configure magnetic storage devices to read more data from the BPM during a passing over the media, placement accuracy of the data has become even more critical. As known, if the data cannot be accurately placed with respect to the dot groupings via the recording head, subsequent readback of such data will likely be incomplete, and generally, useless. In addition, inaccurate placement of data can result in exchange coupling between the dots, thereby compromising the functioning of the recording head.

Thus, magnetic storage device designers have been faced with a dilemma in terms of balancing placement accuracy with writing strategy. Quite often, an advance in one area prompts a decline in the other. For example, increasing the quantity of dots being written to over a set period of time often adversely affects placement accuracy of the data being written to such dots. Thus, to date, magnetic storage devices have generally been designed to write to dots on a magnetic storage medium in a grouping-by-grouping manner. For example, in cases where the dot groupings involve distinct rows of dots, the rows of dots are written to row by row (as described above with respect to FIG. 1) as opposed to all dots being written to during a single pass of the medium. Thus, such conventional writing technique requires multiple passes of the recording head over the medium.

However, even when using this writing technique, particularly when writing dot groupings that will be subsequently read in a single pass, errors have been found to occur. For example, as described above, when separately writing to adjacent rows of dot groupings on a data track of a magnetic recording disk, magnetic storage devices have encountered phase error problems with respect to the dot groupings. These errors have stemmed from relying on precision phase-lock of pattern clock to spindle encoder to maintain position accuracy, and leads to readback errors. As described herein, certain embodiments of the invention involve a system and technique by which dots on a BPM can be written to wherein the writing process is not so adversely impacted. Such writing technique further represents a significant advancement from prior techniques because it enables a plurality of dot groupings to be written to in one pass of a recording head.

Figure 6:
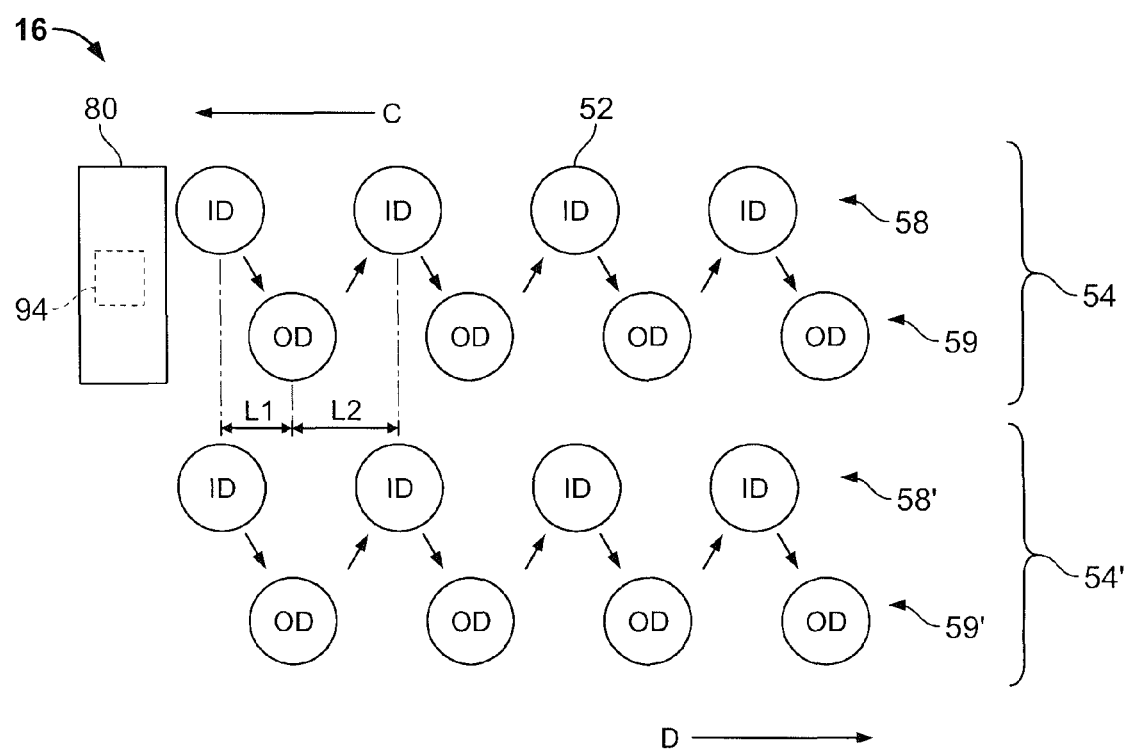
FIG. 6 is a top view of a portion of the magnetic storage medium of FIG. 3 illustrating a writing technique for a dot pattern thereon with a recording head of the magnetic storage device of FIG. 2 in accordance with certain embodiments of the present invention.

FIG. 6 is a top view of a recording head 80 (e.g., of the device 10 shown in FIG. 2) positioned adjacent one data array in a user data sector on a portion of a magnetic storage medium illustrating a writing technique for a dot pattern according to certain embodiments of the present invention. Similar to that described above with respect to FIG. 5, in certain embodiments, the magnetic storage medium can be the magnetic recording disk 16 shown in FIG. 3, with exemplary data tracks 54 and 54' being partially shown. In such embodiments, four groupings of dots 52 are subdivided in the two partially-shown data tracks 54 and 54' of the disk 16. In certain embodiments, the groupings of dots 52 can be rows of dots 52, with each data track 54 and 54' carrying two or more rows.

As described above with reference to FIG. 3, although the data tracks 54, 54' in FIG. 6 are depicted as being two bits wide, it is contemplated that the arrays may also be wider than two bits according to some embodiments. In addition, while the above embodiments are provided with reference to a magnetic recording disk, the invention should not be limited to such as a wide variety of mediums can be alternately used. Further, a variety of dot groupings can be alternately used. As such, the embodiment described with respect to FIG. 6 should be interpreted as but one embodiment of the invention.

As exemplified in FIG. 6, the dots 52 of each of the data tracks 54 and 54' are provided in two rows, rows 58, 59 and rows 58', 59', respectively. In accordance with embodiments of the invention, following positioning of the recording head 80 over either of the tracks, the head 80 can be controlled to write to the corresponding dots 52 on the track. However, the device 10 uses a writing technique contrary to the writing technique described above with respect to FIG. 1. In particular, the dots 52 of the two rows 58, 59 can be written to during a single pass of the recording head 80 over the disk 16. As shown, to enable the head 80 to write in such fashion, in certain embodiments, the dots 52 of the two rows 58, 59 are staggered. In turn, as the head 80 passes over the track 54, the head 80 can be controlled to alternately write to the dots 52 of the rows 58, 59. For example, as shown, upon positioning the recording head 80 over the data track 54, the head 80 is controlled to initially write to a dot 52 in one of the rows, e.g., row 58. As the disk 16 rotates below the head 80 in direction C, the head 80 passes over the disk 16 in an opposing direction D. Accordingly, the next dot 52 to pass below the head 80 is a dot 52 in the row 59. As such, while still being positioned over the data track 54, the head 80 is controlled to write to such dot 52 in the row 59. Such writing sequence is depicted via the arrows shown between the dots 52 in the track 54. Thus, the head 80 is controlled to continue such alternating writing technique to the dots 52 of the two rows 58, 59 as it passes over the track 54. Following the dots 52 of the first data track 54 being written to, the recording head 80 can be positioned over the adjacent data track 54' so that its corresponding rows 58' and 59' can be likewise written to.

Thus, in using the above writing technique, for each of the data tracks 54 and 54', the respective dot groupings 58, 59 and 58', 59' can be written to in a single pass of the recording head 80 over the disk 16. During the writing process, the writing operations of the head 80 are maintained so as to correspond with offset distances between the dots 52 of the dot groupings 58, 59 and 58', 59' of data tracks 54 and 54', respectively. For example, as shown in FIG. 6, in certain embodiments, dot offset distances L1 and L2 are provided between the dots 52 of the groupings. As further detailed below, deflections of a write beam emanating from the recording head 80 can be regulated so as to correspond with these offset distances L1 and L2. Consequently, the writing technique has limited susceptible to low frequency noise in causing placement inaccuracy. Further, as described below, because the writing technique enables writing to a plurality of dot groupings in a single pass over the medium, there is far less potential of encountering the types of phase errors obtained when the dot groupings are each written to during separate passes over the disk 16, as has been conventionally done to date.

In certain embodiments, as shown, the offset distances L1 and L2 are different values, with L1 generally being smaller in length than L2. The offset distances L1 and L2 can be so assigned in order to accommodate skew recording, which is generally preferred as opposed to having the distances L1 and L2 equal to each other. The skew of the dot groupings generally lends itself to creating a latency period from the initiation of a seek process until data can be transferred. For example, referencing FIG. 6, following a write process of a single dot 52 from each of the dot groupings 58 and 59 of data track 54, there is a period of time built into the write process to account for this seek and subsequent transfer of data with respect to the next two dots 52 of the groupings 58 and 59.

As described above, in controlling the recording head 80 to write to pluralities of dot groupings on a magnetic storage medium, the write beam of the head 80 can be continually deflected as it passes over the dot groupings. For example, referencing FIG. 6, as the head 80 passes along data track 54 of the disk 16, thereby sequentially passing over dots 52 of either of the corresponding dot groupings 58 and 59, the write beam of the head 80 is accordingly deflected so as to be directed at such dots 52 in order to write thereto. Although the recording head 80 may utilize other types of deflectable exposure beams, the examples below utilize electron beam recording equipment. Accordingly, an exemplary apparatus for implementing such alternating writing embodiments includes an electron beam column used with the recording head 80, as described below.

Figure 7:
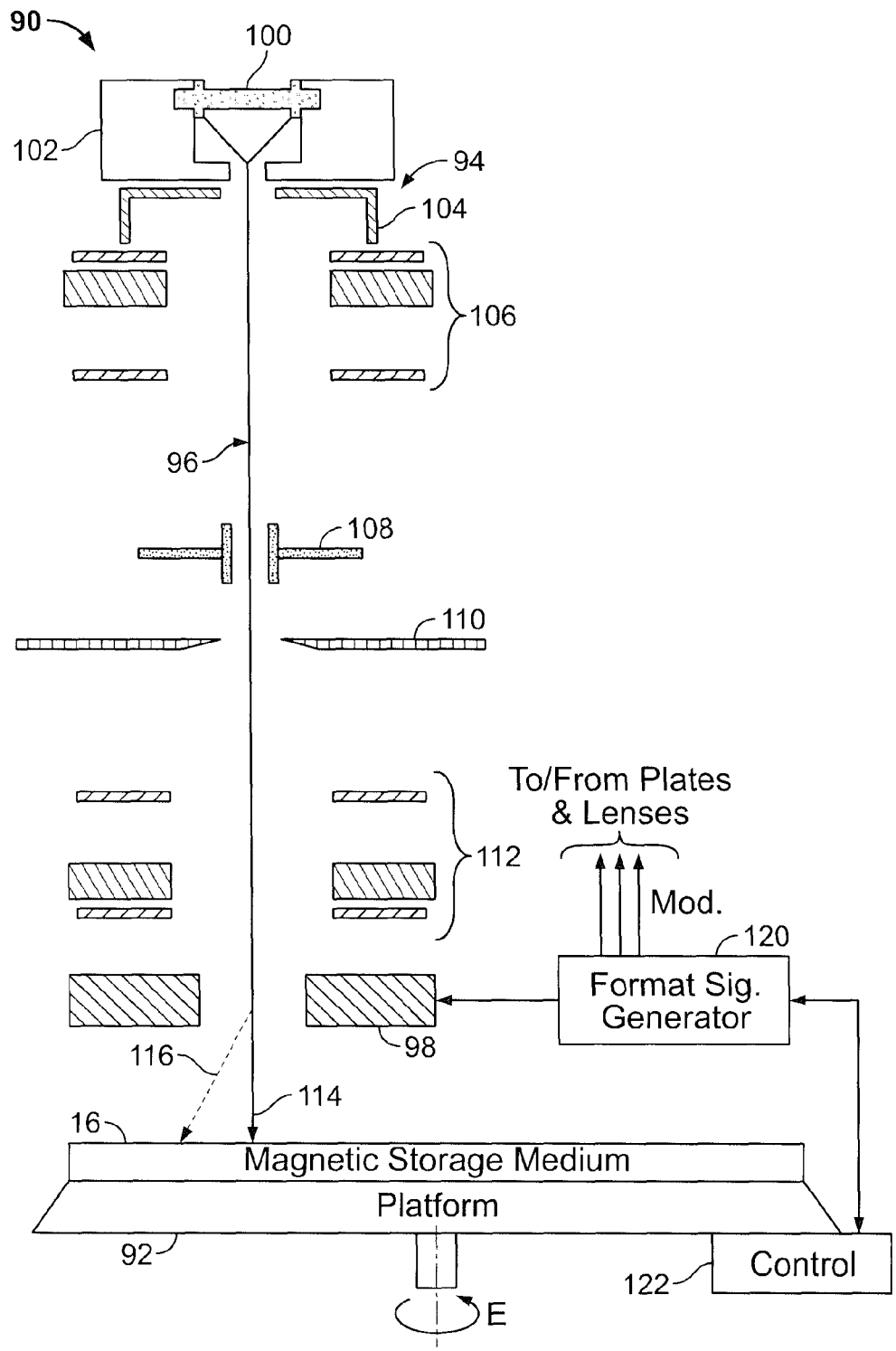
FIG. 7 is a side view of an electron beam disk recorder system used with the magnetic storage device of FIG. 2, with elements of an electron beam shown in cross section, in accordance with certain embodiments of the invention.

FIG. 7 is an exemplary electron beam recording system 90 used in accordance with certain embodiments of the invention. The system 90 includes a platform 92 used for moving a magnetic storage medium. In certain embodiments, as shown, the platform 92 can be a turntable with the magnetic storage medium being a magnetic recording disk, e.g., disk 16 as referenced in FIGS. 2, 3, 5, and 6. Also included in the system 90 is a beam column. In certain embodiments, as shown, such beam column is an electron beam column 94. In certain embodiments, the recording system 90 is configured with the device 10 of FIG. 2, and in particular, the electron beam column 94 is adapted with the recording head 80 (as exemplarily shown with dashed lines in FIG. 6). The electron beam column 94 generates a modulated electron beam 96.

While certain embodiments described herein involve direct deflection of the beam 96 of the beam column 94 using deflection plates (as described below), the invention should not be limited to such. Instead, deflection of the beam 96 can be deflected in other known fashions in the art. In addition, the deflection of the beam 96 can be alternatively provided in any number of indirect manners, while still falling within the scope of the invention. For example, via appropriate deflections of the beam column 94, the beam 96 can resultantly be directed as warranted.

In certain embodiments, as shown in FIG. 7, the electron beam column 94 includes deflection plates 98 for controlling deflection of the modulated beam 96. The turntable 92 supports the disk 16 for rotation in the direction E about its vertical axis beneath the beam emitted by the column 94. It is assumed that those skilled in the art are generally familiar with the structure and operation of available electron beam column devices, however, for completeness of the discussion, a brief summary description thereof is provided below.

In the example, the electron beam column 94 includes a thermal field emission (TFE) electron source 100 and a suppression assembly 102. The column 94 may also include electron extractor 104. When appropriate voltages are applied to the TFE source 100, the suppression assembly 102 and the extractor 104, these elements cooperate to generate a stream of electrons for further processing in the column 94. The stream of electrons passes through a first triple element lens 106, then through blanking plates 108 and a blanking aperture 110. The stream of electrons then passes through one or more additional lenses, represented, for example, by the second triple lens 112 in FIG. 7.

The shapes of and voltages applied to the column elements serve to focus and shape the stream of electrons into an electron beam of a desired shape and having a desired energy level for a particular application, for example, for writing data to dots 52 on the disk 16. FIG. 7 shows the beam traveling through the column 94 as a straight line, for convenience of illustration. In actual operation, the beam would converge and diverge as it passes through the various elements of the column 94, in order to focus on the disk 16 in a desired manner.

Of note, for purposes of the present subject matter, the beam position is controlled by application of a voltage to the deflection plates 98. Without deflection, for example, the beam travels in a perpendicular fashion as shown at 114, from the e-beam column 94 to the disk surface. Applying a deflection voltage to the plates 98 causes corresponding deflection of the beam 96. The polarity of the voltage determines the direction of the deflection. The amplitude of the voltage controls the magnitude of angular deflection of the beam 96, and thus, the linear displacement of the beam 96 at a given distance from the column 94. A deflected beam output is represented by the dotted line 116 in FIG. 7. Typically, the angle, and thus, the linear displacement are proportional to the voltage applied across the plates 98. A DC voltage will produce a constant deflection, and a variable voltage produces a proportionally varying angle of deflection of the beam.

Hence, with deflection, the beam travels at an angle as shown at 116, and the angle (and thus the linear offset on the surface of the disk 16) is responsive to the voltage across the two plates 98. In the illustrated disk processing application, the direction of deflection is along a radius of the disk 16, which is in the cross-track direction with respect to dot groupings on the disk 21. Thus, with reference to the dot patterns illustrated in FIG. 6, as the beam column 94 passes above a data track, e.g., track 54, the beam 96 can be defected accordingly so that the dots 52 of the corresponding dot groupings, e.g., rows 58 and 59, can be accordingly written to.

For example, with continued reference to FIGS. 6 and 7, the recording head 80 is positioned over one of the data tracks, e.g., track 54, thereby further positioning the beam column 94 over the track 54. In turn, the writing process can begin. Techniques have been developed and continue to be advanced to ensure that the position of a recording head is maintained over a centerline of the track as the disk rotates. In certain embodiments, such techniques can be adapted herein with the writing process.

Following the beam column 94 being positioned over one of the data tracks, e.g., track 54, the column 94 passes over the track 54 as the disk 16 rotates. For example, with reference to the dot groupings (rows 58 and 59) on data track 54, the beam 96 generally passes between the groupings. During such pass, as described above, the beam 96 is deflected via a series of deflection signals so as to be correspondingly oriented toward the dots 52 of the corresponding rows 58, 59 as the dots 52 pass below the beam column 94. Each specific deflection signal corresponds with a deflection of the beam 96 so as to enable writing to a specific dot 52 of the data array being written to. As such, in writing to the dots 52 of data track 54, each of the series of deflection signals includes a select polarity and a select amplitude corresponding to the proximity of the dots 52 with respect to the beam column 94.

In keeping with the above example in writing to the dots 52 of track 54, in certain embodiments, the select polarity of the deflection signals is of a first polarity (e.g., positive polarity) for inner dots (ID) of the dot groupings (e.g., rows 58 and 59) and is of a second polarity (e.g., negative polarity) for outer dots (OD) of the dot groupings. For example, with reference to FIG. 6, in writing to the dots 52 of track 54, the inner dots ID are located between a spatial center point 51 for the disk 16 (shown in FIG. 3) and the beam column 94 during the single pass of the beam column 94 over the data track 54, while the outer dots OD are located between the beam column 94 and an outer edge 53 of the disk 16 (shown in FIG. 3) during the single pass of the beam column 94 over the data track 54. Further, in certain embodiments, the select amplitude of the deflection signals is based on the position of the dots 52 of the dot groupings (e.g., rows 58 and 59) relative to position of the beam column 94 during the single pass of the beam column 94 over the data track 54.

As should be appreciated, defining the series of deflection signals by such select polarities and select amplitudes enables the beam 96 to be deflected as warranted to effectively write to a plurality of dot groupings as a beam column flies across the dot groupings. While the embodiments described herein exemplify writing to two dot groupings during a single pass over a magnetic storage medium, the invention should not be limited to such. Instead, the teachings herein are applicable to writing to any given plurality of dot groupings during such a single pass. Further, while the embodiments described herein exemplify writing to a magnetic recording disk using such writing technique, the invention should not be so limited. For example, in certain embodiments, the writing technique is applicable to writing to any magnetic storage medium whereby the recording system is used to write to a plurality of dot groupings along an extent of the medium during a single pass of the beam column over the extent. Also, as illustrated in the disk 16 of FIG. 3, dots 52 of dot groupings of BPMs are commonly alternately staggered along the extents of the tracks of the disk; however, the invention should not be so limited.

Figure 8:
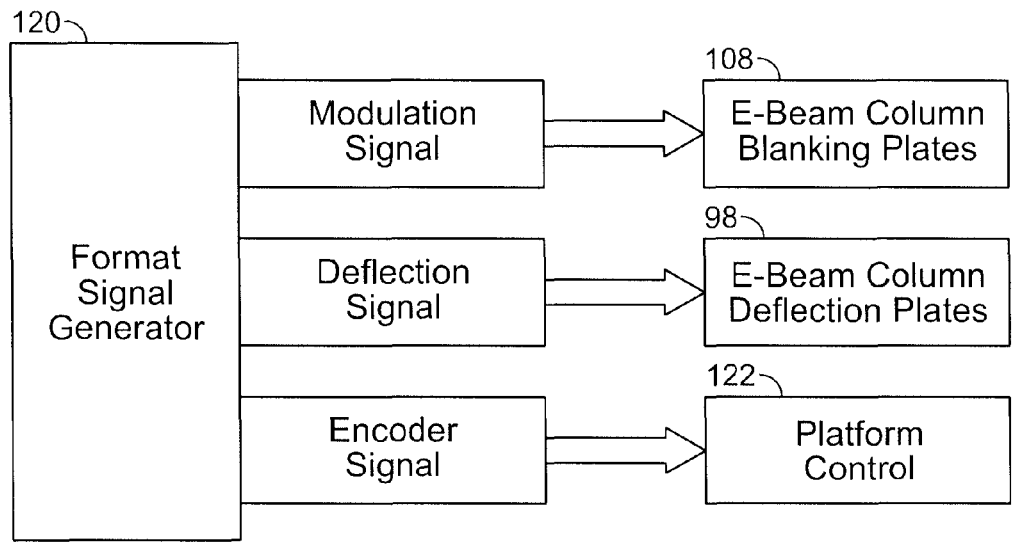
FIG. 8 is a signal flow diagram useful in explaining control of the electron beam column and the turntable in the electron beam disk recorder system of FIG. 7 in accordance with certain embodiments of the invention.

The electron beam recording system 90 further includes a format signal generator 120 for generating various signals used by the electron beam column 94 to modulate the beam 96 and thus format the patterns being exposed on the disk 16. The generator 120 generally includes circuitry forming one or more signal generators, for producing the various signals applied to the components of the column 94 to produce the desired beam. FIG. 8 is a signal flow diagram illustrating some aspects of the function of the format signal generator 120 in accordance with certain embodiments of the invention.

As shown in FIGS. 7 and 8, one example of a signal produced by the generator 120 is the format modulation signal (or beam "format" signal) for application to the blanking plates 108, which controls the energy level of the electron beam 96, and thus the exposure of the recorded pattern on the dots 52. In certain embodiments, a control 122 is used to control the speed and possibly the translational movement of the platform 92 (e.g., in this embodiment, the turntable). The format signal generator 120 provides an encoder signal to the control 122, to regulate the rotational operations of the turntable, and the control 122 may provide one or more feedback signals to the generator 120 indicating turntable position and/or speeds. For example, the control 122 may provide an index signal each time a mark or feature on the turntable or disk 16 passes a reference point. The angle between rotation start point (e.g. 12 o'clock) and the reference point is a known constant. Hence, the index can be used to determine start and end points of successive rotations (e.g., each involving writing operations to a plurality of dot groupings on a data array of a magnetic storage medium).

Figure 9:
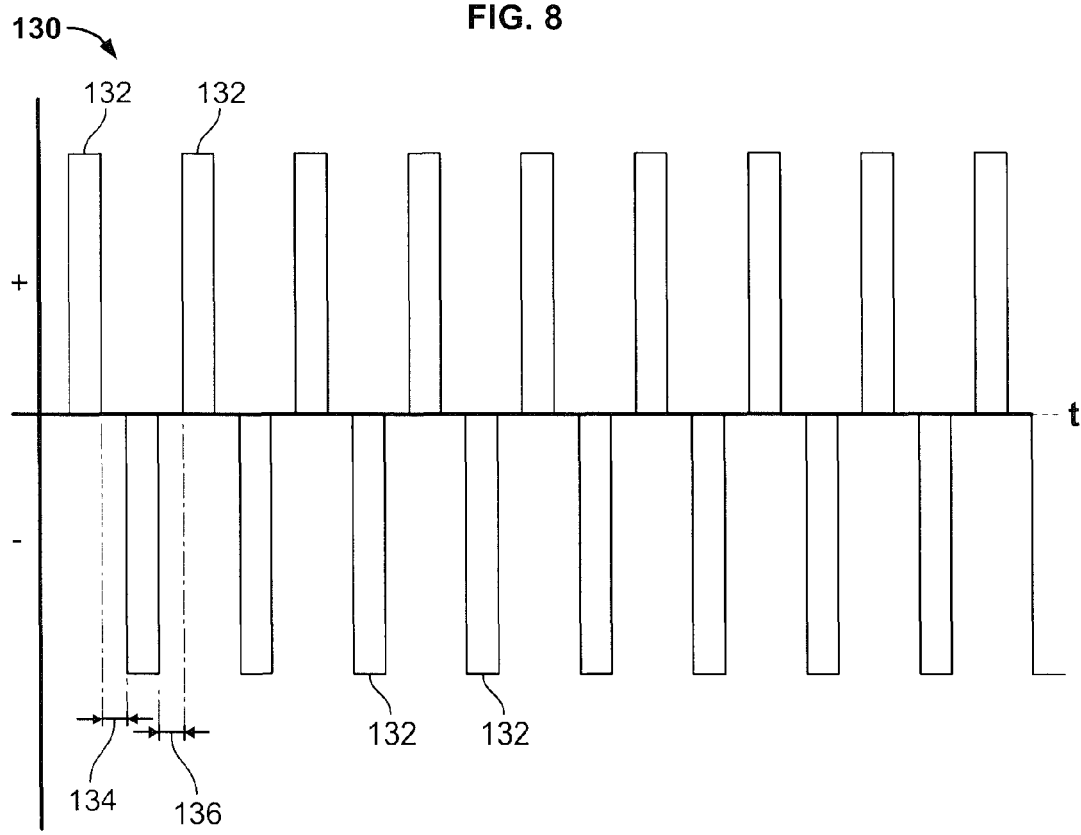
FIG. 9 is a signal diagram for an exemplary pulse train waveform that is triggered in response to a turntable index or the like in accordance with certain embodiments of the invention.

The format signal generator 120 also provides the voltage to the deflection plates 98. In certain embodiments, the format signal generator 120 is programmed to produce a repeating pulse train waveform signal in synchronism with the rotation of the turntable. FIG. 9, as discussed below, is a signal diagram for an exemplary pulse train waveform 130 that is triggered in response to a turntable index or the like in accordance with certain embodiments of the invention. The timing of the flyback of the pulse train waveform is when the beam 96 is needed for writing data to a plurality of dot groupings (e.g., rows 58 and 59) on an extent (e.g., a data track 54) of the disk 16 during a single pass of the beam column 94 above the extent.

While the signal flow diagram of FIG. 8 uses encoder signals, for example, to provide an index signal (as described above), such signal is only taken once for every writing process with respect to a plurality of dot groupings on a data track of the disk. In contrast, when writing to such dot groupings using conventional writing techniques, an encoder signal is taken a plurality of times. As described above, for each dot grouping written to, such conventional techniques have required a separate pass of the beam column over the disk. As such, for each separate pass, a further encoder signal is needed to synchronize the rotation of the disk with the dot grouping being written. Unfortunately, mechanical vibrations from the disk rotating apparatus of the magnetic storage device have been found to cause minute disturbances between these encoder signals. In turn, this led to create phase errors problems, e.g., between paired dot groupings. Such problem is effectively overcome with the writing technique described herein because it only requires one such encoder signal in the writing process, thereby preventing any potential for phase error between the dot groupings being written to. Further, such technique provides a method of writing to a plurality of dot groupings given one pass over the dot groupings, thereby decreasing the amount of time needed to write data to the disk.

As shown by the above embodiment, the series of deflection signals (provided by the pulse train waveform) should be synchronized with the rotation of the disk 16. Those skilled in the art will recognize and understand that there are a number of ways to achieve this synchronization. A few examples that achieve such synchronization by triggering the ramp signal for the deflection can be in response to a rotational index signal, as described above and further below with respect to FIG. 9, as well as in response to a predetermined feature or pulse in the format modulation signal.

As described above, FIG. 9 shows a signal diagram for an exemplary pulse train waveform 130 that is triggered in response to a turntable index or the like. As shown, in certain embodiments, the pulse train waveform 130 is a square wave voltage signal cycling alternatively from positive polarity to negative polarity over its duration; however, the invention should not be limited to such as other like waveforms could be used just as well. As should appreciated, much like a clock signal, each outer limit 132 of the waveform (either at positive or negative polarity) represents a time period during which a dot 52 is being written to by the beam column 94. For example, in certain embodiments with reference to FIG. 6, when the recording head 80 writes to the dots 52 of one of the data tracks (e.g., data track 54), the outer limits 132 of the waveform 130 at positive polarity correspond to writing to the inner dots (ID) of row 58, while the outer limits 132 of the waveform 130 at negative polarity correspond to writing to the outer dots (OD) of row 59. The time durations 134 and 136 between the outer limits 132 represent the precise timed intervals that correspond to the offset distances between adjacent dots 52 in each of the dot groupings. For example, referencing FIG. 6, the time duration 134 would correspond to dot offset distance L1, while the time duration 136 would correspond to dot offset distance L2.

While not being further provided in FIG. 9, the format modulation signal (from the format signal generator 120) is applied to modulate the electron beam and thereby format the data to the dots 52 on the dot groupings of the disk 16. A further signal not provided involves the disk rotation index signal, which provides one pulse per revolution of the disk on the turntable. The index may be generated by the format signal generator 120 or may be generated in response to an index mark or other feature on the turntable (or the disk 16) detected by a sensor, as the disk 16 and turntable rotate. For example, the control 122 may include the sensor and provide the index signal as a form of feedback to the format signal generator 120 (as shown in FIG. 8). The pulse train waveform begins in response to each index pulse and ends (returning to zero) just prior to the next index pulse. As shown, the cycle of the deflection signal corresponds closely to one revolution of the disk and the turntable.

To further maintain precision accuracy of the writing technique, embodiments have been described herein with respect to using an electron beam recording equipment. As described above, even minute disturbances in the functioning of magnetic storage devices (e.g., with respect to moving magnetic storage media therein) can lead to phase error problems because the distances employed in data tracks are extremely small (generally in the range of nanometers). Thus, while not being limited to such, embodiments of the invention can employ electron beam equipment, as described herein, as beam placement using corresponding electron beam columns is known to be in a sub-nanometer range. Accordingly, using such electron beam equipment would enable the recording system to further limit phase errors caused from other sources in using the magnetic storage device.

Certain embodiments are provided herein using BPM as the magnetic storage medium. As described, dots of dot groupings can be provided closer in proximity using BPM as compared to using continuous magnetic medium. Using BPM, it has been described that adjacent dots of such dot groupings are often staggered so as to afford a maximal linear density of dots along data arrays of the BPM. Accordingly, in such applications, beams need to be continually deflected in an alternating fashion to write to the staggered dots of such groupings. Accordingly, in certain embodiments, the beams are applied in a continuously alternating manner to dots on an extent (e.g., data track) of the magnetic storage medium.

Thus, embodiments of the present invention are disclosed. Although the present invention has been described in considerable detail with reference to certain disclosed embodiments, the disclosed embodiments are presented for purposes of illustration and not limitation. The implementations described above and other implementations are within the scope of the following claims.

What is claimed is:

1. A recording system for magnetic storage devices, comprising:
a beam column for generating a beam, the beam column including deflection plates for controlling deflection of the beam in response to a series of deflection signals;
a platform for moving a magnetic storage medium relative to the beam while the beam is applied to a plurality of dot groupings on an extent of the magnetic storage medium during a single pass of the beam column above the extent; and
a signal generator for sequentially supplying the series of deflection signals to the deflection plates of the beam column, wherein the series of deflection signals from the signal generator comprises a plurality of signals each with a select polarity and a select amplitude so as to deflect the beam according to displacement of dots amongst the dot groupings on the magnetic storage medium during the single pass of the beam column;
wherein the dots of the rows are skewed relative to each other such that any given dot of any given dot row is offset from an adjacent dot of a further dot row by a first distance in a direction of the magnetic storage medium when moved and such that said given dot is offset from a further adjacent dot of the further dot row or another dot row by a second distance in a direction opposite that of the magnetic storage medium when moved.

2. The system of claim 1, wherein the platform comprises a turntable and the magnetic storage medium comprises a magnetic recording disk such that movement of the disk by the turntable comprises rotation of the disk relative to the beam, and wherein the extent of the disk comprises a concentric data track.

3. The system of claim 2, wherein the select polarity of the deflection signals comprises a first polarity for inner dots of the dot groupings and comprises a second polarity for outer dots of the dot groupings, with the inner dots being located between a center of the disk and the beam column during the single pass of the beam column over the data track and the outer dots being located between the beam column and an outer edge of the disk during the single pass of the beam column over the data track.

4. The system of claim 2, wherein the select amplitude of the deflection signals is based on position of the dots of the dot groupings relative to position of the beam column during the single pass of the beam column over the data track.

5. The system of claim 1, wherein the dots of the dot groupings are separated from each other along the extent of the magnetic storage medium such that during the single pass of the beam column along the extent only one dot is encountered by the beam at any given time.

6. The system of claim 1, wherein the dot groupings comprise rows of dots, wherein the rows are located along the extent in side by side fashion with the dots being staggered amongst the rows so that one or more offset distances separate adjacent dots of the rows, the one or more offset distances corresponding to one or more time intervals between the deflection signals from the signal generator.

7. The system of claim 6, where the one or more offset distances are in nanometers, wherein the beam column comprises an electron beam column with the beam comprising an electron beam, and wherein deflection accuracy of said electron beam via the deflection signals is in a sub-nanometer range.

8. The system of claim 1, wherein the first distance is less than the second distance.

9. A recording system for magnetic storage devices, comprising:
a beam column for generating a beam, the beam column including deflection plates for controlling deflection of the beam in response to a series of deflection signals;
a platform for moving a magnetic storage medium relative to the beam while the beam is applied in a continuously alternating manner to write at least two staggered rows with skewed dots in a single pass on an extent of the magnetic storage medium; and a signal generator for sequentially supplying the series of deflection signals to the deflection plates of the beam column, wherein the series of deflection signals from the signal generator comprises a plurality of signals each with a select polarity and a select amplitude so as to continuously alternate deflection of the beam according to displacement of the dots for each single pass on the extent of the magnetic storage medium.

10. The system of claim 9, wherein the platform comprises a turntable and the magnetic storage medium comprises a magnetic recording disk such that movement of the disk by the turntable comprises rotation of the disk relative to the beam, and wherein the extent of the disk comprises a concentric data track.

11. The system of claim 9, wherein the dots comprise two or more dot groupings, the dots of the dot groupings being staggered from each other along the extent of the magnetic storage medium such that as the beam is applied in a continuously alternating manner along the extent the staggered dots are sequentially encountered by the beam.

12. The system of claim 11, wherein the dot groupings comprise rows of dots, wherein the rows are located along the extent in side by side fashion with the dots being staggered amongst the rows so that one or more offset distances separate adjacent dots of the rows, the one or more offset distances corresponding to one or more time intervals between the deflection signals from the signal generator.

13. The system of claim 12, where the one or more offset distances are in nanometers, wherein the beam column comprises an electron beam column with the beam comprising an electron beam, and wherein deflection accuracy of said electron beam via the deflection signals is in a sub-nanometer range.

14. The system of claim 12, wherein the dots of the rows are skewed relative to each other such that any given dot of any given dot row is offset from an adjacent dot of a further dot row by a first distance in a direction of the magnetic storage medium when moved and such that said given dot is offset from a further adjacent dot of the further dot row or another dot row by a second distance in a direction opposite that of the magnetic storage medium when moved.

15. The system of claim 14, wherein the first distance is less than the second distance.

16. A method of recording to a plurality of dot groupings on a magnetic storage medium, the method comprising:
generating a beam from a beam column;
moving a magnetic storage medium relative to the beam whereby the beam is applied along an extent of the magnetic storage medium as the magnetic storage medium is moved;
using a predefined timed-voltage to control deflection signals of the beam;
applying the deflection signals to beam; and
deflecting the beam as the beam is applied to the extent of the magnetic storage medium so as to sequentially direct the beam to dots of a plurality of dot groupings along the extent as the magnetic storage medium is moved, wherein at least two staggered rows of skewed dots are written in a zigzag pattern in a single pass on the extent of the magnetic storage medium.

17. The method of claim 16, wherein the magnetic storage medium comprises a magnetic recording disk, wherein moving the magnetic recording disk comprises rotating the disk, and wherein the extent of the disk comprises a concentric data track.

18. The method of claim 16, wherein deflecting the beam results in the beam being applied in a continuously alternating manner along the extent of the magnetic storage device.

19. The method of claim 16, wherein the dot groupings comprise rows of dots, wherein the rows are located along the extent in side by side fashion with the dots being staggered amongst the rows so that one or more offset distances separate adjacent dots of the rows, wherein adjacent dots of a first dot row are separated by a first offset distance and adjacent dots of a second dot row are separated by a second offset distance, wherein the first offset distance is less than the second offset distance.

* * * * *